US006396951B1

(12) United States Patent
Grefenstette

(10) Patent No.: US 6,396,951 B1
(45) Date of Patent: May 28, 2002

(54) DOCUMENT-BASED QUERY DATA FOR INFORMATION RETRIEVAL

(75) Inventor: Gregory Grefenstette, Gieres (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/218,357

(22) Filed: Dec. 23, 1998

(30) Foreign Application Priority Data

Dec. 29, 1997 (GB) ............................................ 9727322

(51) Int. Cl.[7] ............................ G06K 9/00; G06K 9/18; G06K 9/54; G06F 7/00; G06F 17/28

(52) U.S. Cl. ....................... 382/187; 382/181; 382/185; 382/186; 382/229; 382/305; 707/3; 707/4; 707/5; 704/2; 704/3; 704/5; 358/403

(58) Field of Search ................................ 382/181, 186, 382/187, 190, 305, 185, 229, 231; 704/2, 3, 9, 10, 5, 7; 707/3, 4, 1, 5; 358/403

(56) References Cited

U.S. PATENT DOCUMENTS

| | | | | |
|---|---|---|---|---|
| 5,272,764 A | | 12/1993 | Bloomberg et al. | 382/164 |
| 5,301,109 A | | 4/1994 | Landauer et al. | 704/9 |
| 5,325,091 A | | 6/1994 | Kaplan et al. | 341/51 |
| 5,523,946 A | | 6/1996 | Kaplan et al. | 704/2 |
| 5,692,073 A | | 11/1997 | Cass | 382/219 |
| 5,694,559 A | * | 12/1997 | Hobson et al. | 345/336 |
| 5,748,805 A | | 5/1998 | Withgott et al. | 382/306 |
| 5,812,818 A | * | 9/1998 | Adler et al. | 703/23 |
| 5,890,103 A | * | 3/1999 | Carus | 704/9 |
| 5,978,754 A | * | 11/1999 | Kumano | 704/3 |
| 6,006,221 A | * | 12/1999 | Liddy et al. | 707/5 |
| 6,067,510 A | * | 5/2000 | Kimura et al. | 704/7 |

FOREIGN PATENT DOCUMENTS

| | | |
|---|---|---|
| EP | 0 544 434 A2 | 6/1993 |
| EP | 0 583 083 A2 | 2/1994 |
| EP | 0 590 858 A1 | 4/1994 |
| EP | 0 762 298 A2 | 9/1995 |
| EP | 0 725 353 A1 | 8/1996 |
| EP | 0 741 487 A2 | 11/1996 |
| JP | 050466059 | 2/1993 |
| JP | 07044564 | 2/1995 |
| JP | 07160715 | 6/1995 |
| JP | 08305728 | 11/1996 |
| JP | 09101991 | 4/1997 |
| WO | WO 97/18516 | 5/1997 |

OTHER PUBLICATIONS

Ballesteros, Lisa et al. "Dictionary Methods for Cross–Lingual Information Retrieval," in Proceedings of the 7$^{th}$ International DEXA Conference on Database and Expert System, pp. 791–801.

Beesley, Kenneth R. "Language Identifier: A Computer Program for Automatic Natural–Language Identification of On–Line Text," In the Proceedings of the 29$^{th}$ Annual Conference of the American Translators Association, 1988.

(List continued on next page.)

*Primary Examiner*—Leo Boudreau
*Assistant Examiner*—Daniel G. Mariam
(74) *Attorney, Agent, or Firm*—Oliff & Berridge, PLC

(57) ABSTRACT

To obtain a query for use in information retrieval, a document is scanned. The resulting text image data define an image of a segment of text in a first language. Automatic recognition is then performed on at least part of the text image data to obtain text code data including a series of element codes. Each element code indicates an element that occurs in the first language, and the series of element codes defines a set of expressions that also occur in the first language. Automatic translation is then performed on a version of the text code data to obtain translation data indicating a set of counterpart expressions in a second language. The counterpart expressions are used to automatically obtain query data defining the query. The query can then be provided to an information retrieval engine.

14 Claims, 14 Drawing Sheets

OTHER PUBLICATIONS

Grefenstette, Gregory "Comparing Two Language Identification Schemes," In the Proceedings of 3rd International Conference on Statistical Analysis of Textua Data (JADT 1995), Rome, Italy; Dec., 1995, vol. II, pp. 263–268.

De Marcken, Carl G. "Parsing the Lob Corpus," In the Proceedings of the 28th Annual Meeting of the Association for Computational Linguistics; Jun. 6–9, 1990; Pittsburgh, PA: pp. 243–251.

McEnery, Tony et al. Corpus Linguistics, Tony McEnery and Andrew Wilson, Ed., Edinburg University Press, Jul. 1996, pp. 117–145 and 189–192.

Porter, M.F. "An Algorithm for Suffix Stripping," Program, vol. 14, No. 3, Jul. 1980, pp. 130–137.

Salton, Gerard et al. Introduction to Modern Information Retrieval, McGraw–Hill Book Company, New York, 1983, pp. 130–136.

Sibun, Penelope et al. "Language Determination: Natural Language Processing from Scanned Document Images," In the Proceedings of the Fourth Applied Natural Language Processing Conference; Stuttgart, Germany; 1994, pp. 15–21.

U.S. Patent Application No. 09/212,662 entitled "Identifying a Group of Words Using Modified Query Words obtained from Successive Suffix Relationships" to Eric Gaussier et al., filed Dec. 16, 1998.

U.S. Patent Application No. 09/213,309 entitled "Grouping Words with Equivalent Substrings by Automatic Clustering Based on Suffix Relationships" to Eric Gaussier et al., filed Dec. 16, 1998.

U.S. Patent Application No. 09/219,615 entitled "Automatic Language Identification using Both N–Gram and Word Information" to Bruno M. Schulze, filed Dec. 23, 1998.

European Search Report for EPO counterpart Application No. EP 98 12 4839, Mar. 11, 1999.

Great Britain Search Report for GB counterpart Application No. GB 9727322.1, Apr. 30, 1998.

* cited by examiner

REF 0276772N ECH 12.08.97

RANK XEROX RESEARCH CENTRE
LE QUARTZ
6 CHEMIN DE MAUPERTUIS

61 - - - -

Le M

4

CINQUANTE-DEUXIÈME ANNÉE – N° 16048 – 7 F

SAMEDI 31 AO

Plus de 13 000 malades du sida bénéficient des trithérapies

2

13 300 PERSONNES infectées par le virus du sida suivent actuellement en France une trithérapie, qui associe plusieurs médicaments dont une molécule antiprotéase. Dès le 1er janvier 1997, ces traitements devraient être disponibles en pharmacie. La polémique du printemps dernier est ainsi oubliée : à l'époque, face aux menaces de rationnement, le Conseil national du sida avait envisagé de recourir à un tirage au sort des malades. Si elles demeurent des traitements expérimentaux dont l'efficacité ne pourra être jugée qu'à long terme, les trithérapies semblent d'ores et déjà redonner espoir aux malades.

Lire page 7

Paris et Bonn réaffirment l pour réaliser l'Union éco

En France, le chômage a baissé

JACQUES CHIRAC et Alain Juppé, ont réaffirmé jeudi 29 août, devant les ambassadeurs de France, que la France *« sera au rendez-vous et respectera les échéances »* du calendrier de mise en place de la monnaie unique européenne. Ils ont confirmé que la politique de rigueur serait maintenue au moment où ils peuvent se prévaloir de deux bons résultats : le chômage a reculé de 0,7 % au mois de juillet en raison d'une augmentation du nombre d'entrées en stages ; le commerce extérieur a dégagé, au premier semestre, un excédent de 53,2 milliards de francs.

L'engagement français devrait recevoir un renfort d'outre-Rhin. Lors de leur rencontre dimanche 1er septembre à Bonn, MM. Chirac et Kohl entendent en effet assurer conjointement qu'ils ne changeront pas depolitique économique.

La nouvelle bataille d'Okinawa

Le sort des bases américaines va dominer la vie politique japonaise dans les prochains mois. p. 3

Tension à Jérusalem

A vendre, île écossaise

LONDRES
*de notre correspondant*

A une dizaine de milles marins au sud de l'île de Skye, en Ecosse, s'alignent quatre petites îles dont l'une, Eigg, est à vendre. Ses habitants, lassés de passer d'un propriétaire foncier *(laird)* à un autre, ont décidé de s'unir pour la racheter. Soixante-trois personnes vivent sans électricité sur les 7 534 acres lions de francs) à l'ancien leigh Keith Schellenberg, obtenue en 1975 d'un pr pour 260 000 livres (2,08 Trois *lairds* absentéistes après une longue gestio Runciman, voilà de quoi tranquilles îliens, lassés veloppement non tenu

*FIG. 4*

Plus de 13 000 malades du sida bénéficient des trithérapies

13 300 PERSONNES infectées par le virus du sida suivent actuellement en France une trithérapie, qui associe plusieurs médicaments dont une molécule antiprotéase. Dès le 1er janvier 1997, ces traitements devraient être disponibles en pharmacie. La polémique du printemps dernier est ainsi oubliée : à l'époque, face aux menaces de rationnement, le Conseil national du sida avait envisagé de recourir à un tirage au sort des malades. Si elles demeurent des traitements expérimentaux dont l'efficacité ne pourra être jugée qu'à long terme, les trithérapies semblent d'ores et déjà redonner espoir aux malades.

*Lire page 7*

FIG. 5

```
207> more Lemonde
Plus de  (;

du sida béléficient des trithérapies 13 300 PERSONNES infectées par le
virus du sida suivent actuellement en Irance une trithérapie, qui
associe plusieurs médicaments dont une molécule antiprotéase. Dès le ~
janvier 1997, ces traitements devraient être disponibles en pharmacie.
La polémique du printemps dernier est ainsi oubliée: à l'époque, face
aux menaces de rationnement, le Conseil national du sida avait envisagé
de recou'ir à un tirage au sort des malades. Si elles demeurent des
traitements exp~rmentaux dont l'efficacité ne pourra être jugée qu'à
long terme, les trithérapies semblent d'ores et déjà redonner espoir a~
malades.

```

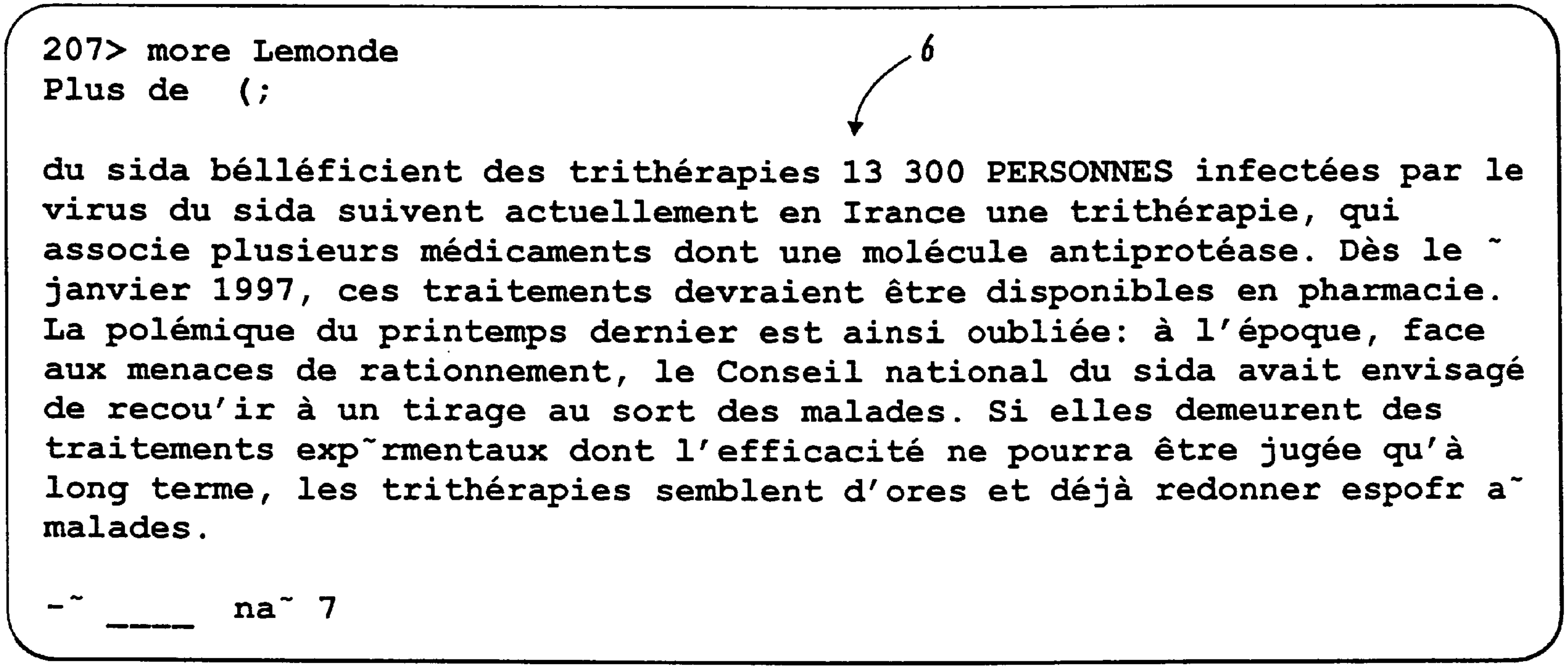

FIG. 6

```
204> cat latest.trec | gawk -f /home/grefen/Trans/dic.awk | gawk 'NF>1' | more
sida           | Aids
bélléficient   | bélléficient
trithérapies   | trithérapies
13300          | 13300
personne       | person
infecter       | infected septic infect poison
virus          | bug craze virus
sida           | Aids
suivre         | follow
actuellement   | moment present currently
Irance         | Irance
trithérapie    | trithérapie
associer       | share joy sorrow indignation associated combine combined partnership link associate
médicament     | medicine drug remedy
molécule       | molecule
antiprotéase   | antiprotéase
janvier        | January
1997           | 1997
traitement     | handling processing salary treatment
devoir         | duty homework test respects accepted one's country owe
disponible     | available
pharmacie.     | pharmacie.
polémique      | debate
printemps      | spring
dernier        | performance
ainsi          | ainsi
oublier        | forgotten forget oneself accident leave
époque         | period costume setting time epoch era
face           | compared opposite camp face side surface confront typeface
menace         | threat
rationnement   | rationing
conseil        | advice consultant council
national       | national trunk road highway nationals
sida           | Aids
envisagé       | envisagé
recou'ir       | recou'ir
tirage         | circulation draught draft friction hard copy impression print printing run
--More--
```

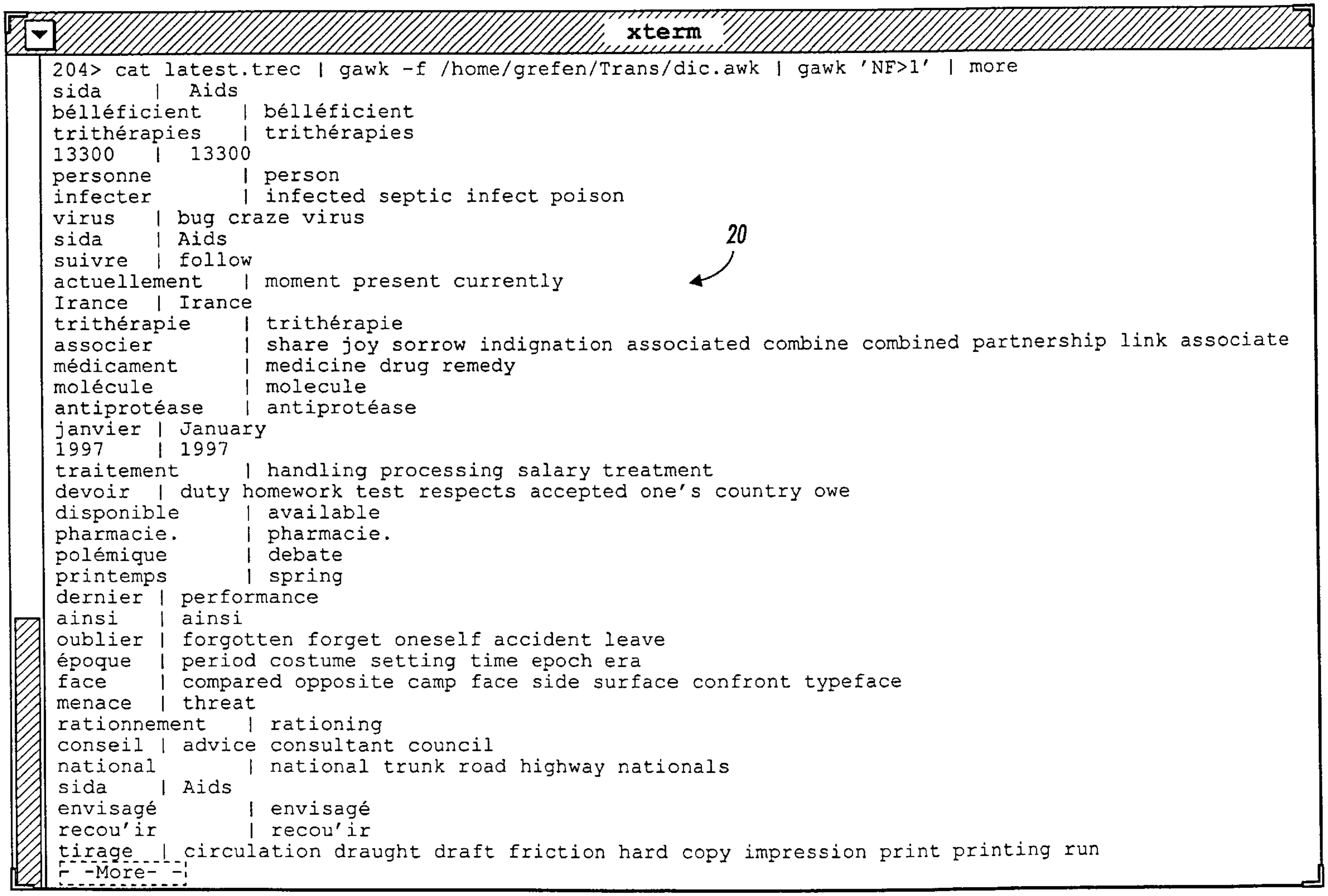

FIG. 9

DOCUMENT-BASED QUERY DATA FOR INFORMATION RETRIEVAL

FIELD OF THE INVENTON

The present invention relates to obtaining query data for information retrieval.

BACKGROUND AND SUMMARY OF THE INVENTION

Most multilingual speakers can read some languages more easily than they can generate correct utterances and written expressions in those languages. When searching for information, existing information retrieval systems require that the user formulate a query in the language (target language or L2) of the documents and, normally, physically type in the query. Thus, as well as including a query formulation step, such systems do not allow a user to indicate their search interests in their native language (L1).

Ballesteros, L., and Croft, W. B., "Dictionary Methods for Cross-Lingual Information Retrieval", in *Proceedings of the 7th International DEXA Conference on Database and Expert Systems*, 1996, pp. 791–801, disclose techniques in which a user can query in one language but perform retrieval across languages. Base queries drawn from a list of text retrieval topics were translated using bilingual, machine-readable dictionaries (MRDs). Pre-translation and post-translation feedback techniques were used to improve retrieval effectiveness of the dictionary translations.

EP-A-725,353 discloses a document retrieval and display system which retrieves source documents in different languages from servers linked by a communication network, translates the retrieved source documents as necessary, stores the translated documents, and displays the source documents and translated documents at a client device connected to the communication network.

U.S. Pat. No. 5,748,805 discloses a technique that provides translations for selected words in a source document. An undecoded document image is segmented into image units, and significant image units such as words are identified based on image characteristics or hand markings. For example, a user could mark difficult or unknown words in a document. The significant image units are then decoded by optical character recognition (OCR) techniques, and the decoded words can then be used to access translations in a data base. A copy of the document is then printed with translations in the margins opposite the significant words.

The invention addresses a problem that arises with information retrieval where a user has a document in one language (L1) and wishes to access pertinent documents or other information written in a second language (L2) and accessible through a query-based system. Specifically, the invention addresses the problem of generating a query that includes expressions in the second language L2 without translating or retyping the document in the first language L1, referred to herein as the document-based query problem. The document-based query problem arises, for example, where the user cannot translate the document from L1 to L2, where the user is unable to type or prefers not to type, where the user does not have access to a machine with a keyboard on which to type, or where the user does not know how to generate a query that includes expressions in L2.

The invention alleviates the document-based query problem by providing a new technique that scans the document and uses the resulting text image data. The new technique performs automatic recognition to obtain text code data with a series of element codes defining expressions in the first language. The new technique performs automatic translation on a version of the text code data to obtain translation data indicating counterpart expressions in the second language. The new technique uses the counterpart expressions in the second language to automatically obtain query data defining a query for use in information retrieval.

The new technique can be implemented with a document that is manually marked to indicate a segment of the text, and text image data defining the indicated segment can be extracted from image data defining the document.

Automatic recognition can be implemented with optical character recognition (OCR), and automatic language identification can be performed to identify the probable predominant language so that language-specific OCR can be performed. The OCR results can also be presented to the user, who can interactively modify them to obtain the text code data.

Automatic translation can be implemented with a translation dictionary. The text code data can be tokenized to obtain token data; the token data can be disambiguated to obtain disambiguated data with parts of speech for words; the disambiguated data can be lemmatized to obtain lemmatized data indicating, for each of a set of words, either the word or a lemma for the word; and the lemmatized data can be translated. Translation can be done by looking up the words and lemmas in a bilingual translation dictionary.

The query data can define the query in a format suitable for an information retrieval engine. The query data can then be provided to the information retrieval engine.

The new technique can also be implemented in a system that includes a scanning device and a processor connected for receiving image data from the scanning device. After receiving an image of a segment of text in the first language from a scanned document, the processor performs automatic recognition to obtain text code data, performs automatic translation on a version of the text code data to obtain translation data indicating expressions in the second language, and uses the expressions to automatically obtain query data defining a query for use in information retrieval.

An advantage of the invention is that it eliminates the need for knowing how information interest (or query) should be formulated in the target language, as well as eliminating the need for imagining and typing in the query. In certain embodiments of the invention, the user need only designate a portion of an existing document, e.g. a hardcopy document, which is of interest to him.

The following description, the drawings, and the claims further set forth these and other aspects, objects, features, and advantages of the invention.

BRIEF DESCRIPTION OF THE DRAWINGS

FIG. 4 shows a document from which a user wishes to isolate a portion of text;

FIG. 5 depicts the text portion isolated by the user;

FIG. 6 shows the result of OCR in FIG. 3A on the text portion of FIG. 5;

FIG. 9 depicts the results of bilingual on-line dictionary look-up in FIG. 3B performed on the lemmas of FIG. 8;

DETAILED DESCRIPTION

Figure 1:
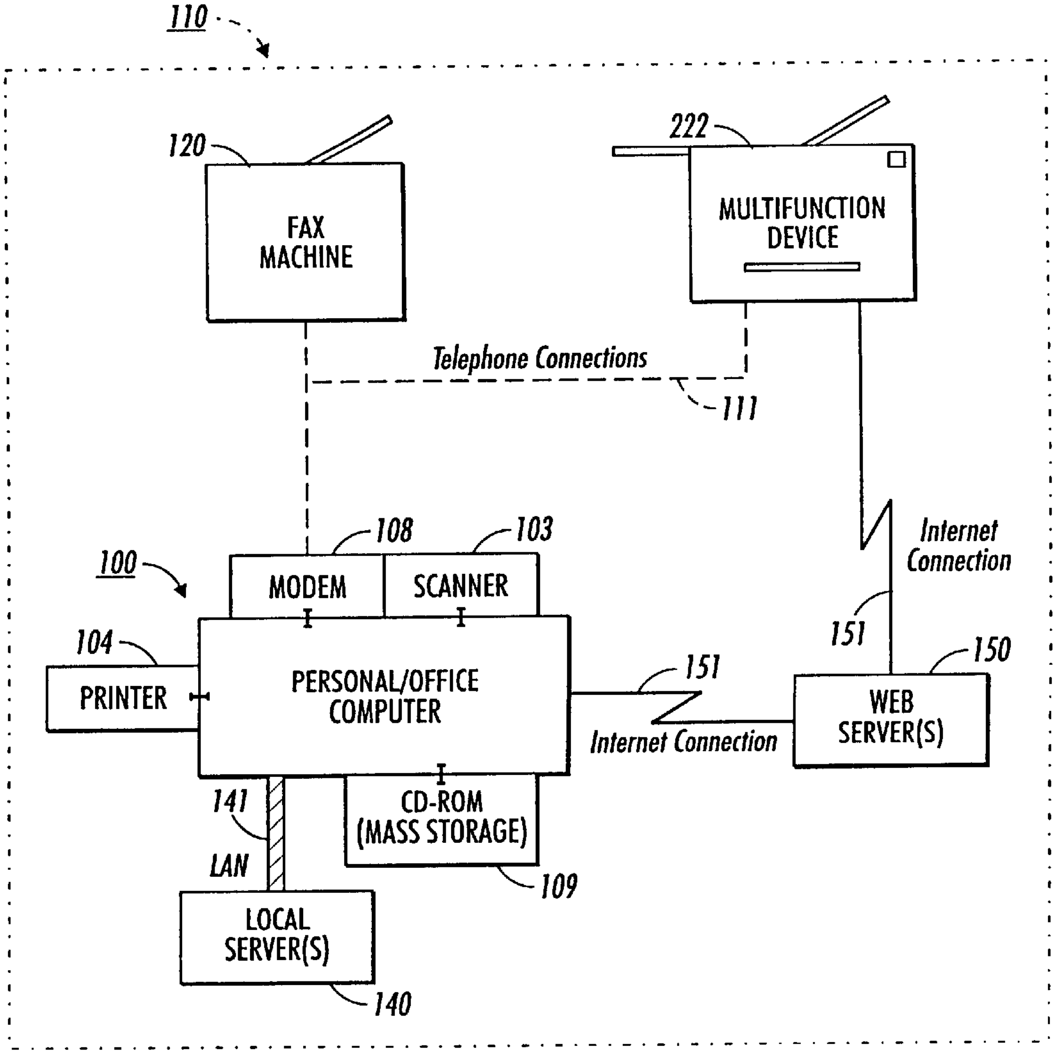
FIG. 1 schematically illustrates an exemplary computer network that may be employed in using a document in a first language to obtain a query with expressions in a second language for use in information retrieval.

FIG. 1 schematically depicts an example of a computational system or network 110 suitable as a basis for implementing embodiments of the invention: this is discussed further in U.S. Pat. No. 5,692,073, incorporated herein by reference. System 110 includes a fax machine 120, a "smart" multifunction device (MFD) 130 (that is, a multifunction device incorporating a processor (CPU) and memory), a personal or office computer 100, one or more local server computers 140, and one or more World Wide Web server computers 150. These are connected by various communications pathways including telephone connections 111, a local area network 141, and the Internet 151. Computer 100 includes a modem 108 and optionally a CD-ROM mass storage device 109, and has attached peripherals including an optical scanner 103 and a printer 104.

Persons of skill in the art will appreciate that the design of system 110 is intended to be illustrative, not restrictive. In particular, it will be appreciated that a wide variety of computational, communications, and information and document processing devices can be used in place or in addition to the devices 120, 140, 150, and 100 shown in system 110. Indeed, connections through the Internet 151 generally involve packet switching by intermediate router computers (not shown), and computer 100 is likely to access any number of Web servers 150 during a typical Web browsing session. Also, the devices of system 110 can be connected in different ways. For example, printer 104 is shown as being an attached peripheral of computer 100, but it could also be a networked printer, accessed via local area network 141 through a print server that is one of the local servers 140.

The various communication pathways 111, 141, 151 in system 110 allow the devices 120, 130, 140, 150, 100 to communicate with one another. Telephone connections 111 allow fax machine 120 to communicate with MFD 130, and also with computer 100 by way of modem 108. Local area network 141 allows computer 100 to communicate with local server(s) 140. The Internet 151 allows MFD 130 and computer 100 to communicate with Web server(s) 150.

A wide variety of possibilities exists for the relative physical locations of the devices in system 110. For example, fax machine 120 and MFD 130 can be in the same building as each other or around the globe from one another, and either or both can be in the same building as computer 100 or around the globe from computer 100. Web server(s) 150 can likewise be at local (so-called "Intranet") or remote sites with respect to computer 100 and MFD 130. The distance between computer 100 and local server(s) 140, of course, is limited by the technology of local area network 141.

A user or users can access system 110 at various points and in various ways. For example, a user can provide inputs to and receive outputs from system 110 through fax machine 120, through MFD 130, or through the scanner 103 and printer 104 of computer 100. In particular, a user who is near fax machine 120 can send a fax from fax machine 120 to computer 100, and computer 100 (which may be suitably programmed with Formless Forms PUI software) can automatically send a fax back to the user at fax machine 120. Similarly, the user can send a fax from fax machine 120 to MFD 130 and MFD 130 (likewise assumed to be suitably programmed) can automatically send a fax back to the user at fax machine 120. A user who is near computer 100 can interact with computer 100 through its PUI in conjunction with scanner 103 and printer 104. A user who is near MFD 130 can interact with MFD 130 through its scanning and printing capabilities, thereby using MFD 130 as a kind of personal computer, a computer having a user interface that is primarily or even exclusively paper-based. Finally, the user can interact with Web server(s) 150 by browsing the Web. This can be done directly from computer 100 or MFD 130, or indirectly from fax machine 120 by way of either computer 100 or MFD 130.

Figure 2:
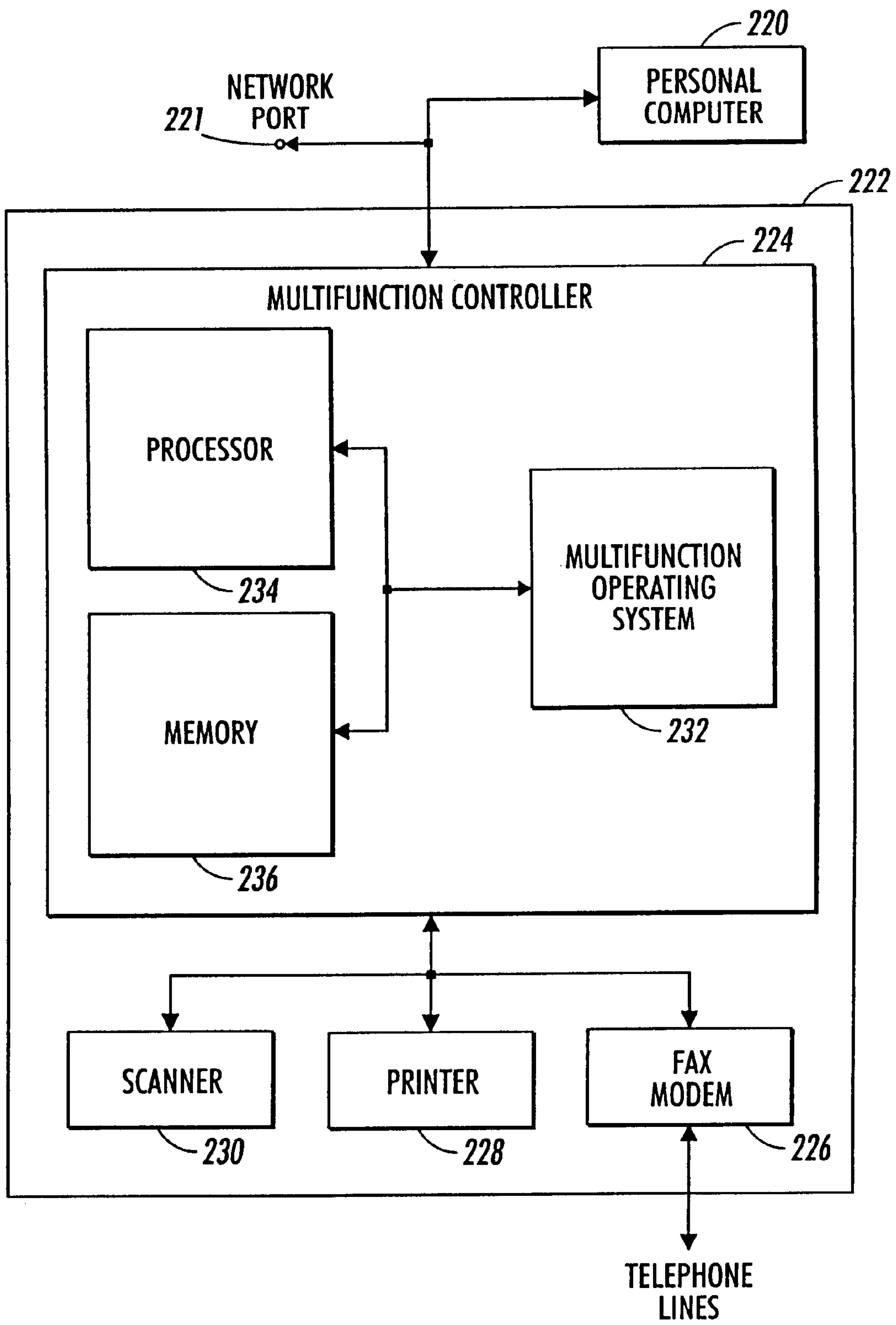
FIG. 2 is a schematic block diagram of the multifunction device in the network of FIG. 1.

FIG. 2 is a block diagram of a multifunction device (MFD) which may be employed in the implementation of the present invention: this is discussed further in EP-A-741,487, incorporated herein by reference. The block diagram of FIG. 2 illustrates a MFD 222, which enables a user of a personal computer 220 to move easily between paper and electronic representations of a document. The MFD 222 prints documents, copies documents, as well as transmitting and receiving facsimile documents. MFD 222 performs these tasks via multifunction controller 224, fax modem 226, scanner 230, and printer 228. Though not shown, MFD 222 may also include an additional display device such as a CRT or LCD display. Multifunction controller 224 controls the operation and cooperation of input/output devices 226, 228 and 230 using multifunction operating system 232. The multifunction operating system 232 selects appropriate command sequences, which it passes to processor 234 for execution. Multifunction operating system 232 may be realized as software stored within a memory device, and may be for example, Microsoft at Work™.

Fax modem 226, scanner 230, printer 228, network port 221, and multifunction controller 224 represent the documents that they handle using scan line signals. Scanner 230 generates scan line signals from the images on a hard copy document, while printer 228 marks images on a marking medium using scan line signals. Fax modem 226 and multifunction controller 224 use scan line signals received from the PC 220, a network port 221, telephone lines, the printer 228, or the scanner 230 to enable movement of information between electronic media and paper. The functionality of the multifunction operating system 232 is enhanced by calls to additional processes, including those according to embodiments of the present invention. Those processes are preferably realized using instructions executed by the processor 234 and stored in object code form within a memory 236. The memory 236 can be realized using solid state memory devices such as ROM, RAM, DRAM, PROM, EPROM and EPROM.

It will be apparent to persons skilled in the art that where references are made herein to steps, operations or manipulations involving characters, words, passages of text, etc., these are implemented, where appropriate, by means of software controlled processor operations upon machine readable (e.g. ASCII code) representations of such characters, words and text. Similarly, references to steps, operations, or manipulations involving images, image segments or documents can be implemented, where appropriate, by means of software controlled processor operations upon data representations of such images, image segments, or documents such as would be produced by any of the scanning devices in system 110, whether scanner 103, fax machine 120, or MFD 222. In either case, the processor could be any of the processors in system 110, whether a processor in fax machine 120, a central processing unit (CPU) or other processor in computer 100 or computer 220, a processor in web server(s) 150, or processor 234 in MFD 222.

Figure 3A:
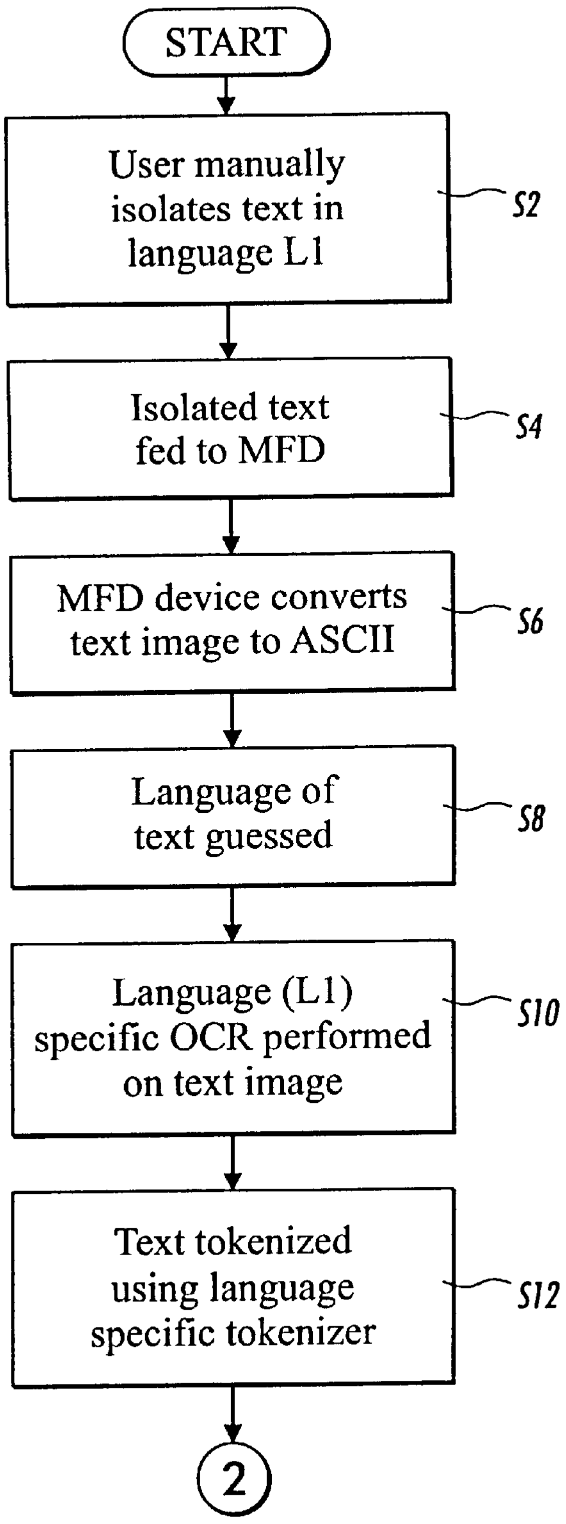
FIGS. 3A, 3B, and 3C together are a flow diagram schematically illustrating detailed acts that can be performed in using a document in a first language to obtain a query with expressions in a second language for use in information retrieval.
Figure 3B:
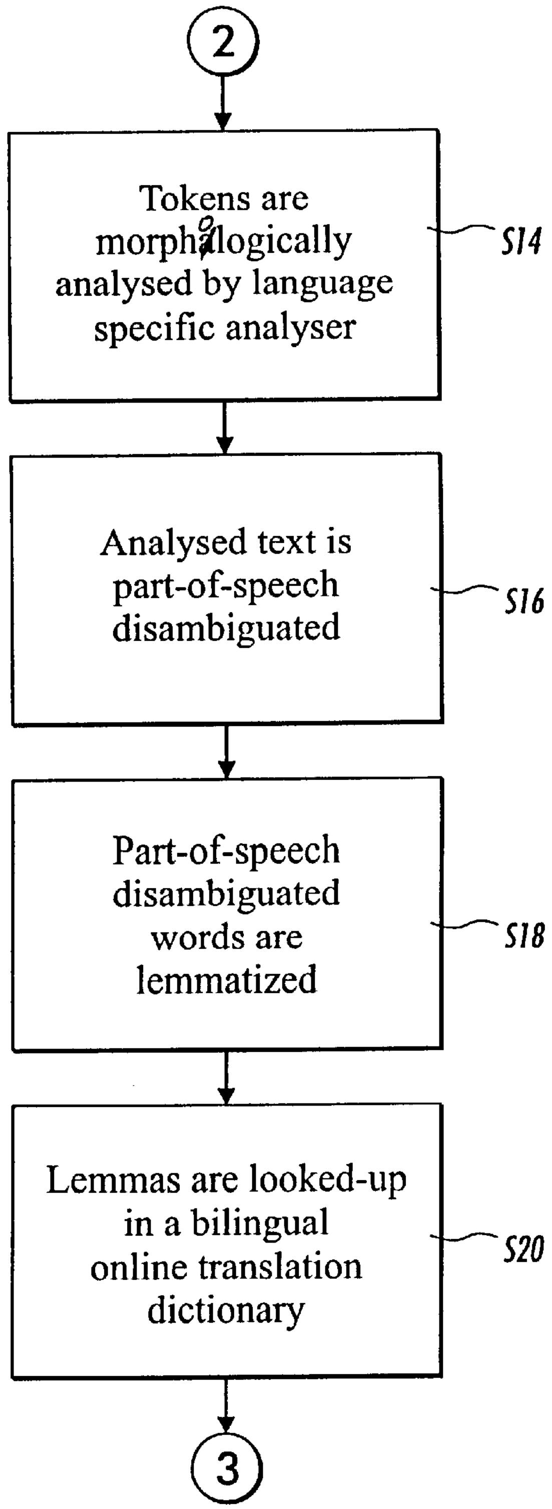
Figure 3C:
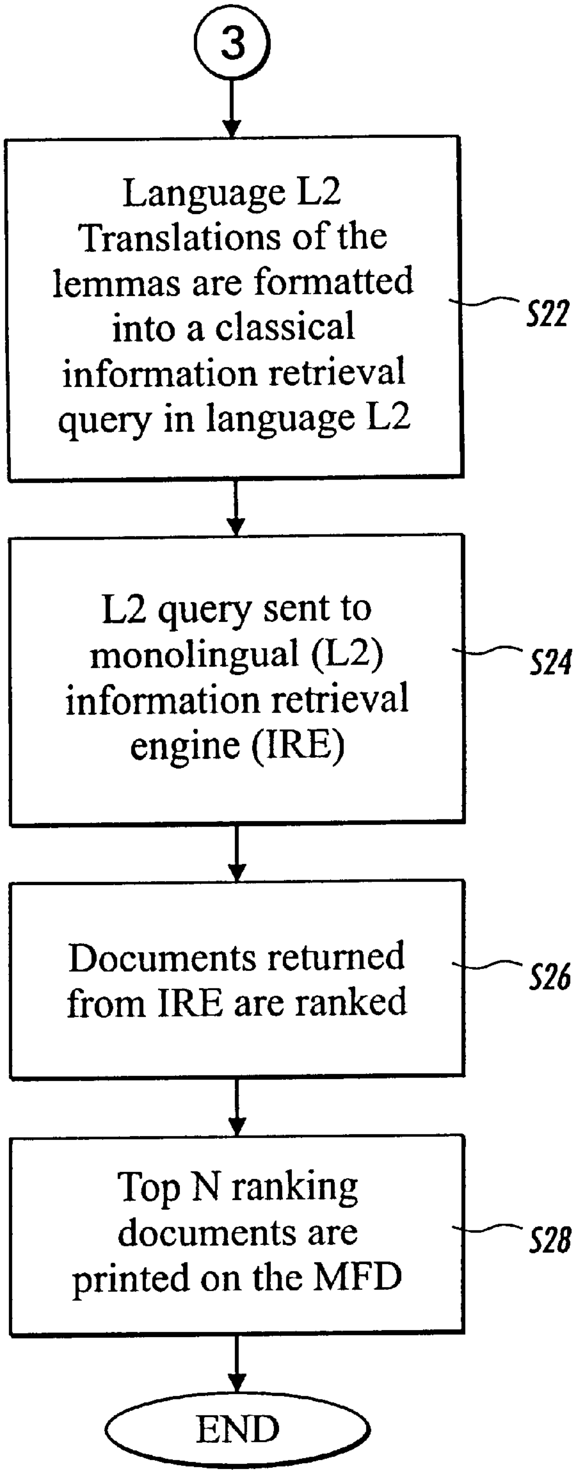

FIGS. 3A, 3B and 3C illustrate a flow diagram schematically illustrating acts in an implementation of the invention. As seen in box S2 in FIG. 3A, initially, the user can manually isolate the portion of text that he or she wishes to use as the basis of a multilingual search. FIG. 4 shows a document (illustratively part of the front page of a newspaper, though any document could be used) from which a user wishes to isolate a portion of text: here, the chosen portion is the text portion 2, which is an article in the newspaper, the language L1 is French, and the user isolates the text portion 2 by cutting it out of the newspaper, as shown in FIG. 5. The act in box S2 can thus comprise scanning the text portion 2 alone. The user then places the isolated portion 2 on the platen of MFD 222 or another scanning device for scanning. After image data defining an image of text portion is obtained, the image data can be provided to processor 234 of MFD 222, as shown in box S4, or to another processor. The image data, which may take the form of a file, may be supplied to the processor directly, via a network connection, or through another connection.

Alternatively, the user may isolate the text portion 2 by drawing a marking 4 around the text portion 2. In this case, based on this marking 4, the acts in boxes S2 and S4 are replaced by the user making the marking 4 and scanning the document in FIG. 4 using MFD 222 or another scanning device. Processor 234 of MFD 222 or another processor could then extract the marked portion 2 using conventional image processing techniques.

The user could alternatively highlight the text portion 2 using a suitable ink prior to the scanning by MFD 222 or another scanning device, and processor 234 of MFD 222 or another processor could then extract text which has been thus highlighted. Techniques for performing this type of extraction are described in more detail in U.S. Pat. No. 5,272,764, incorporated herein by reference.

The scanned image could alternatively be presented to the user, such as on the display of a computer, and the user could interactively isolate text portion 2, such as with a mouse or other pointing device or by suitable interaction with a touchscreen or other user input device.

Once the isolated text portion 2 has been scanned and/or extracted, and image data defining text portion 2 has been provided to processor 234 of MFD 222 or another processor, the processor can perform a conversion of the image data generated by the scanning or extracting operation to codes such as ASCII, as shown in box S6, with each code representing a character or other element that occurs in the language of text portion 2. The conversion can be performed using known optical character recognition (OCR) technology, such as ScanworX or TextBridge, available from ScanSoft Corporation of Peabody, Mass. OCR in box S6 could be preceded by character set recognition, and OCR could be performed in a manner that is appropriate for the recognized character set but is not language-specific. The conversion could alternatively be performed using word recognition.

FIG. 6 shows the result of OCR in FIG. 3A on the text portion 2 in FIG. 5. The sequence of characters illustrated in OCRed text 6 represent a series of element codes that define expressions in the language of text portion 2, for which processor 234 of MFD 222 or another processor now has a file in ASCII format. At this stage the user may, provided MFD 222 or other processor has a display and keyboard or other suitable user interface (UI), correct any apparent errors in OCRed text 6.

Returning to FIG. 3A, OCRed text 6 may next be subjected to a language guessing operation, as shown in box S8. If the language L1 of the text portion 2 is not known in advance, the OCR operation in box S6 may be sub-optimal. Language guessing techniques are discussed, for example, in Beesley K. R., "Language Identifier: a program for automatic language identification of on-line texts", in *Languages at the Crossroads: Proc. 29th Ann. Conf. Am. Translators Assoc.* (Oct. 12–16, 1988), pp. 47–54; in Grefenstette, G., "Comparing Two Language Identification Schemes," *JADT* 1995, *3rd International Conference on Statistical Analysis of Textual Data, Rome*, Dec. 11–13 1995, pp. 263–268; and in coassigned U.S. Pat. No. 6,167,369, entitled "Automatic Language Identification Using Both N-gram and Word Information", all incorporated herein by reference. The result of the optional language guessing operation in box S8 is to determine L1 or a language candidate—the language found to be the most likely for L1. Then, in box S10, OCR is performed once again on the scanned image of portion 2 using a language (L1) specific OCR tool. Again, at this stage the user may, provided MFD 222 or other processor has a display and keyboard or other suitable UI, correct any apparent errors in the OCRed text generated by the language specific OCR operation.

In box S12, OCRed text 6 can be tokenized, using conventional techniques such as those described in McEnery T. and Wilson A., *Corpus Linguistics* (1996), Edinburgh Press, and also in U.S. Pat. Nos. 5,523,946 and 5,325,091 to Kaplan et al., incorporated herein by reference. The result is tokenized text, meaning a text portion which is split up into tokens for further processing.

With reference to box S14 in FIG. 3B, the tokens can be morphologically analyzed using a language (L1) specific analyzer. Morphological analysis using finite state transducer technology is discussed further in EP-A-583,083, incorporated herein by reference.

Next, in box S16, the words obtained as a result of the morphological analysis can be subjected to part-of-speech disambiguation or tagging, as described in detail in de Marcken C. G. "Parsing the LOB Corpus", 28th Ann. Meeting of the ACL, Pittsburgh, Jun. 6–9 1990. See also in McEnery T. and Wilson A., *Corpus Linguistics*, Chapter 3 and Appendix B.

Figure 7:
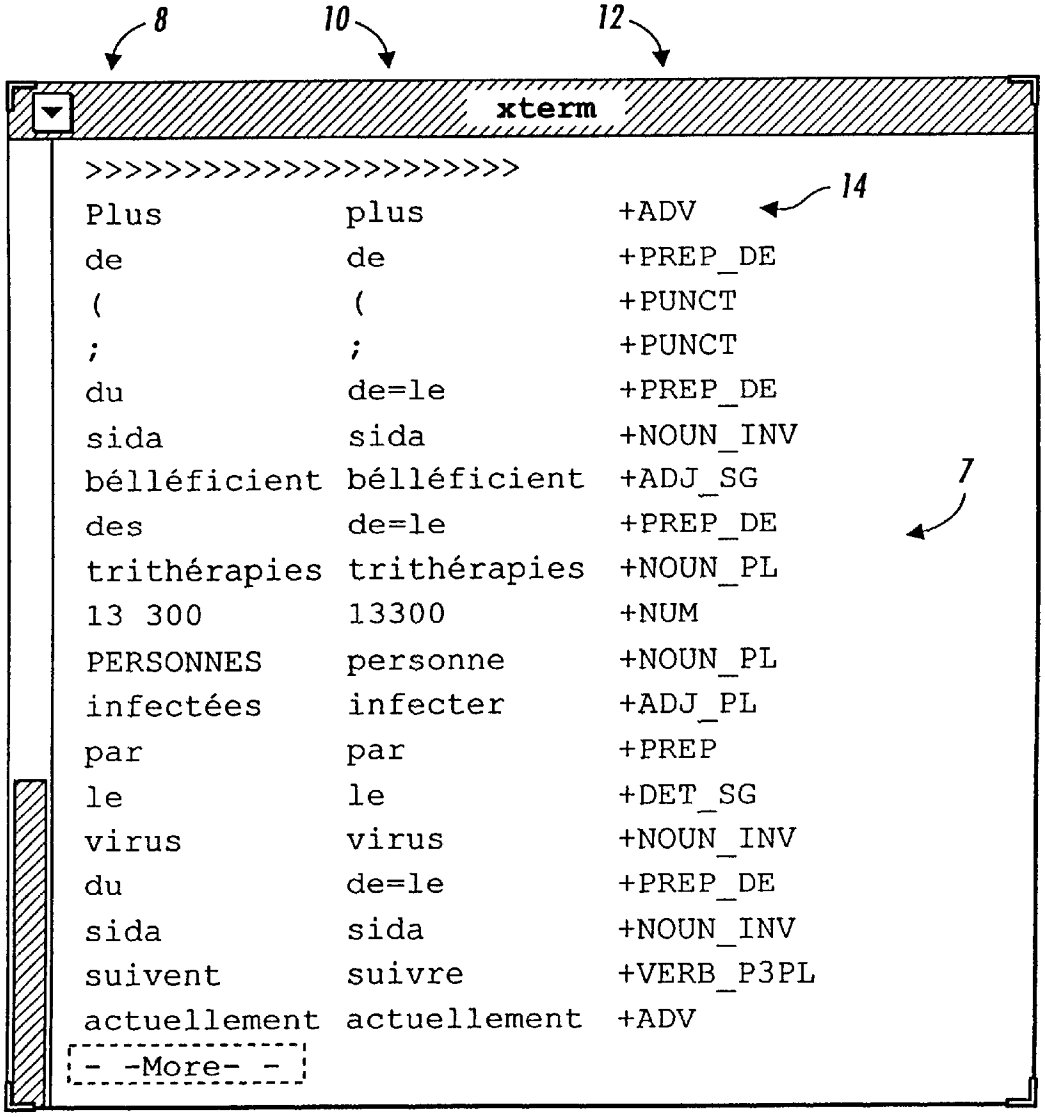
FIG. 7 illustrates the results of the tokenization, morphological analysis and part-of-speech tagging (disambiguation) in FIGS. 3A and 3B.

FIG. 7 illustrates the results of the tokenization, morphological analysis and part-of-speech tagging (disambiguation) steps in FIGS. 3A–3C, as processed text 7. This is illustrated by means of three columns 8, 10, 12 containing, respectively, the tokens derived from the OCRed text 6, the morphs obtained by FST morphological analysis, and the part-of-speech tags applicable to the word. Thus, for example, in the row designated 14, the word (token) "Plus" is in the first columnn, the morph "plus" in the second, and the tag "+ADV" (denoting adverb) in the third.

Figure 8:
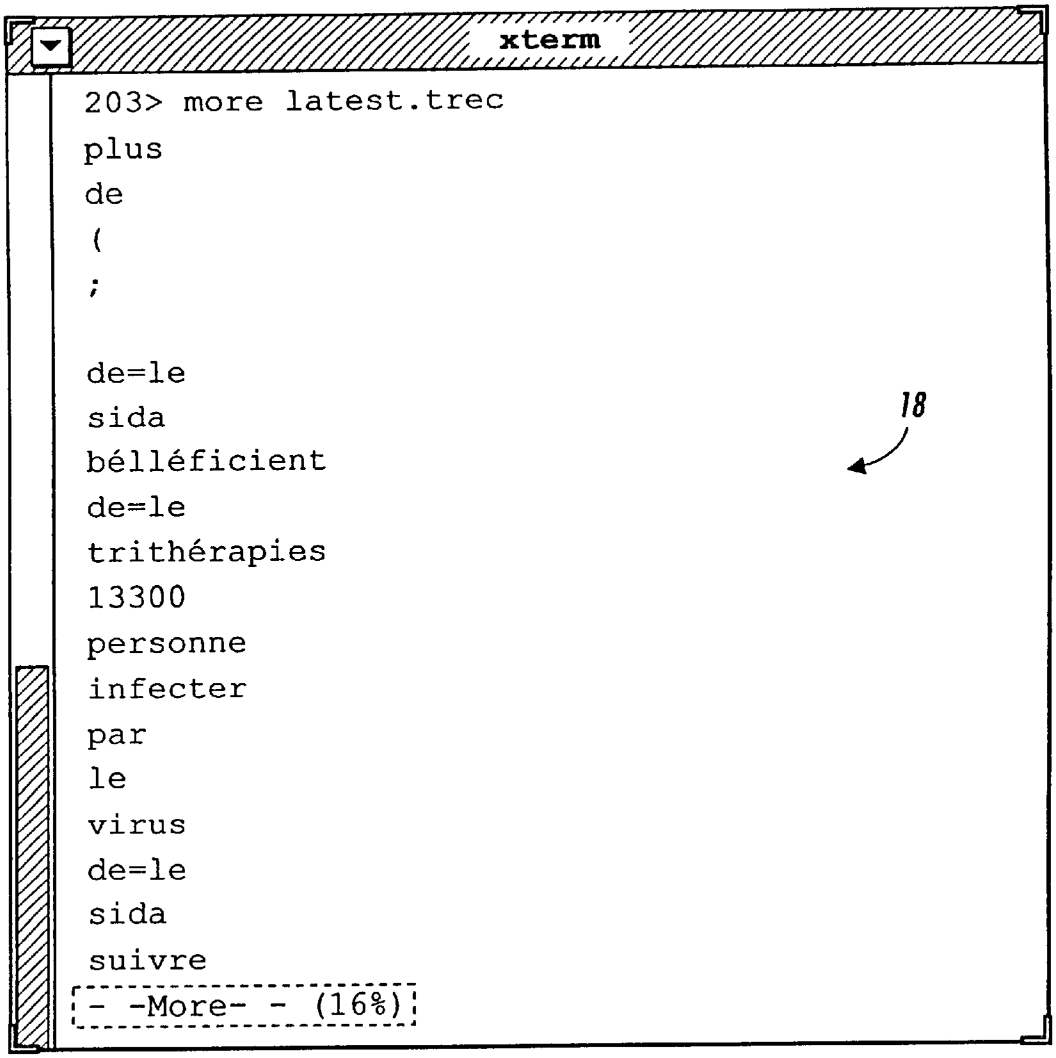
FIG. 8 shows the results of the lemmatization in FIG. 3B on the disambiguated text of FIG. 7.

FIG. 8 shows the results of lemmatization in box S18 in FIG. 3B on the disambiguated text 7 of FIG. 7. Thus, for each word-morph-tag triumvirate in the text 7, the lemma (or dictionary headword form) is extracted or the word itself is retained as the lemmatized form; see the abovementioned EP-A-583,083 for disclosure of how lemmatization may be implemented. The resulting set of words (generally designated 18 in FIG. 8) is used for subsequent processing.

The acts in boxes S12 through S18 in FIGS. 3A and 3B are optional and could be replaced by any other operations that would prepare the automatically recognized codes for automatic translation.

For example, one could replace the sequence of morphological analysis, part of speech tagging, and lemmatization by language-specific stemming, as disclosed for English in Porter, M. F., "An algorithm for Suffix Stripping", *Program*, Vol. 14, No. 3, 1980, pp. 130–137. In this case the dictionary headwords would have to undergo the same stemming processes before the lookup depicted in box S20 of FIG. 9. This technique creates more noise than the technique described in boxes S12 through S18 since semantically different words are sometimes stemmed to the same stem by techniques such as those disclosed by Porter. For example "factory" and factorial" are both stemmed to "factori" by the Porter stemmer, which would mean that the dictionary entries for both would be conflated by using Porter stemming to replace the acts shown in boxes S12 to S18.

Various similar techniques could be used instead of Porter stemming, including those described in copending, coassigned U.S. patent applications Ser. No. 09/213,309 (Attorney Docket No. R/98022), entitled "Grouping Words With Equivalent Substrings by Automatic Clustering Based on Suffix Relationships", and Ser. No. 09/212,662 (Attorney Docket No. R/98022Q), entitled "Identifying a Group of Words Using Modified Query Words Obtained From Successive Suffix Relationships", both incorporated herein by reference.

Another alternative would be to apply a full form generator to dictionary headwords, generating duplicate dictionary entries for every possible form that a word could take. For example, the dictionary entry for the word "infect" would be duplicated as many times as necessary in order to create dictionary entries for "infects", "infected", and "infecting." With such a greatly expanded dictionary, one could simply tokenize the input text or tokenize and part-of-speech tag the text, and look up using the word forms as they appear in the text since there would then be a headword in the dictionary for every word form found in the text. This approach however has the drawback of making the dictionary much bigger, and would not be feasible for languages such as Finnish or Arabic in which one word may have hundreds of different string representations in unlemmatized text.

FIG. 9 depicts the results of bilingual on-line dictionary look-up in box S20 in FIG. 3B, performed on each of the lemmas in the text 18 of FIG. 8. Here the second or target language L2 is English. Therefore, for each lemma, an on-line French-English dictionary is looked-up to obtain one or more corresponding translations in English, in a manner known in the art. Translation data indicating expressions in L2 could alternatively be obtained through on-line Web sites or other products or services that provide automatic translation, and look-up could alternatively be performed using a bilingual database, parallel corpora, or a manually or automatically constructed bilingual lexicon constructed from parallel corpora.

For the sake of illustration in FIG. 9, the information is presented in the following format: Lemma in L1 I Translation word(s) in L2. Thus, by way of example, for the sixth lemma "infecter", the translation words "infected", "septic", "infect" and "poison" are returned. The set of translation words in L2 (generally designated 20 in FIG. 9) are used as the basis for subsequent processing. Again, at this stage the user may, provided MFD 222 or other processor has a display and keyboard or other suitable UI, intervene to eliminate any unwanted translation words from among the set 20.

Figure 10:
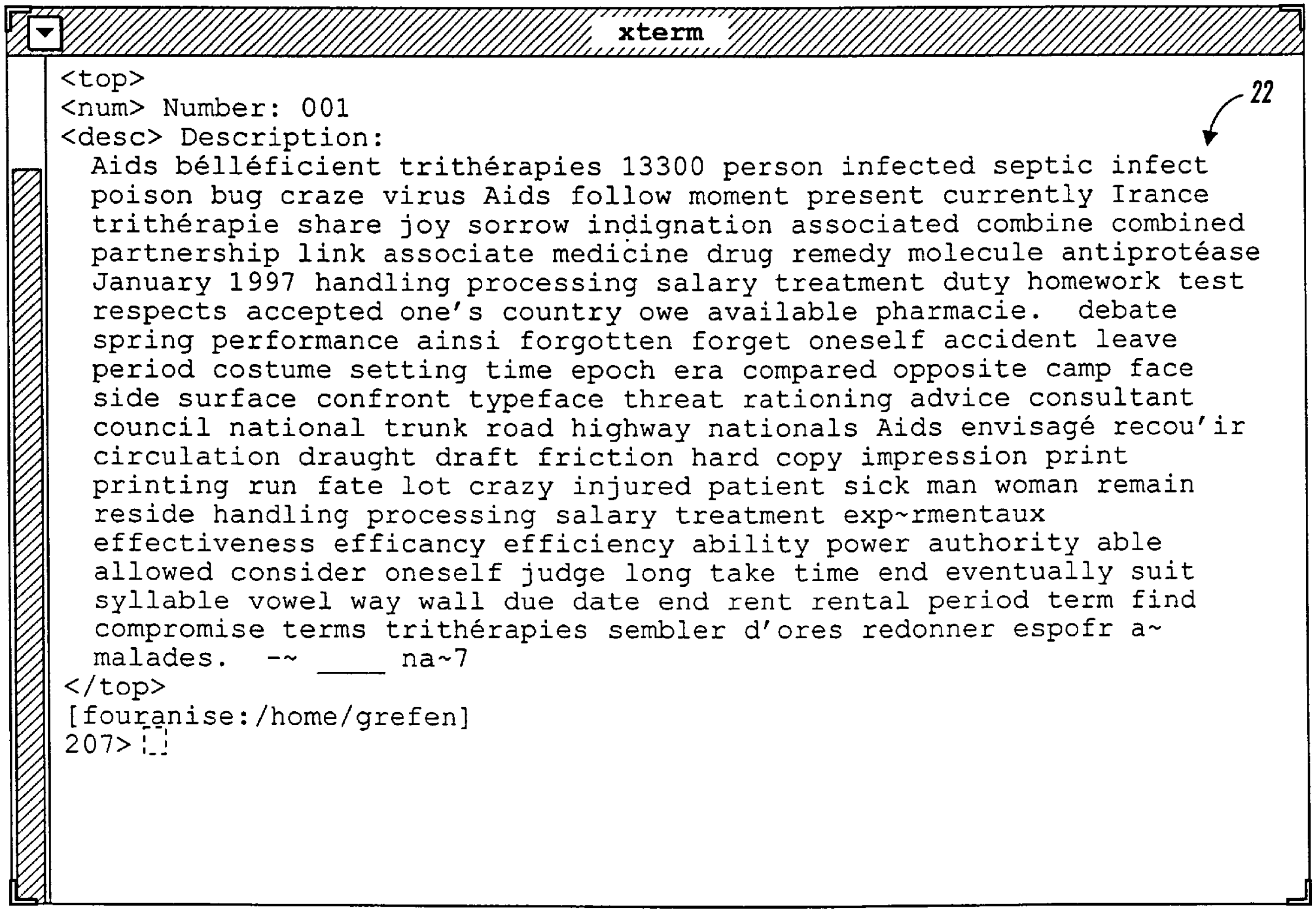
FIG. 10 shows a textual query resulting from the formatting operation of FIG. 3C on the text in language L2 derived from the results in FIG. 9.

In box S22 in FIG. 3C, the set 20 of translation words derived from the lemmas can be formatted into a classical information retrieval (IR) query in language L2. FIG. 10 shows a textual query 22 defined by query data resulting from the formatting operation in box S22. The format of the query depends on the language of the monolingual IR engine being used. The query 22 may be formatted for any suitable IR system, such as SMART (see Salton G., "The SMART retrieval system: Experiments in Automatic Document processing", Prentice-Hall, Englewood Cliffs, N.J. 1971). Once formatted, the query 22 can be sent, in box S24, to the monolingual (L2) IR engine (at a suitable site on the network) for retrieving information corresponding to the query 22. A list of document titles relevant to the query can be received back from the IR engine in the conventional manner and, if the list is not already ranked in order of relevance, the list can be modified so that the documents are so ranked, as in box S26, in the manner disclosed in the abovementioned Salton reference.

Figure 11:
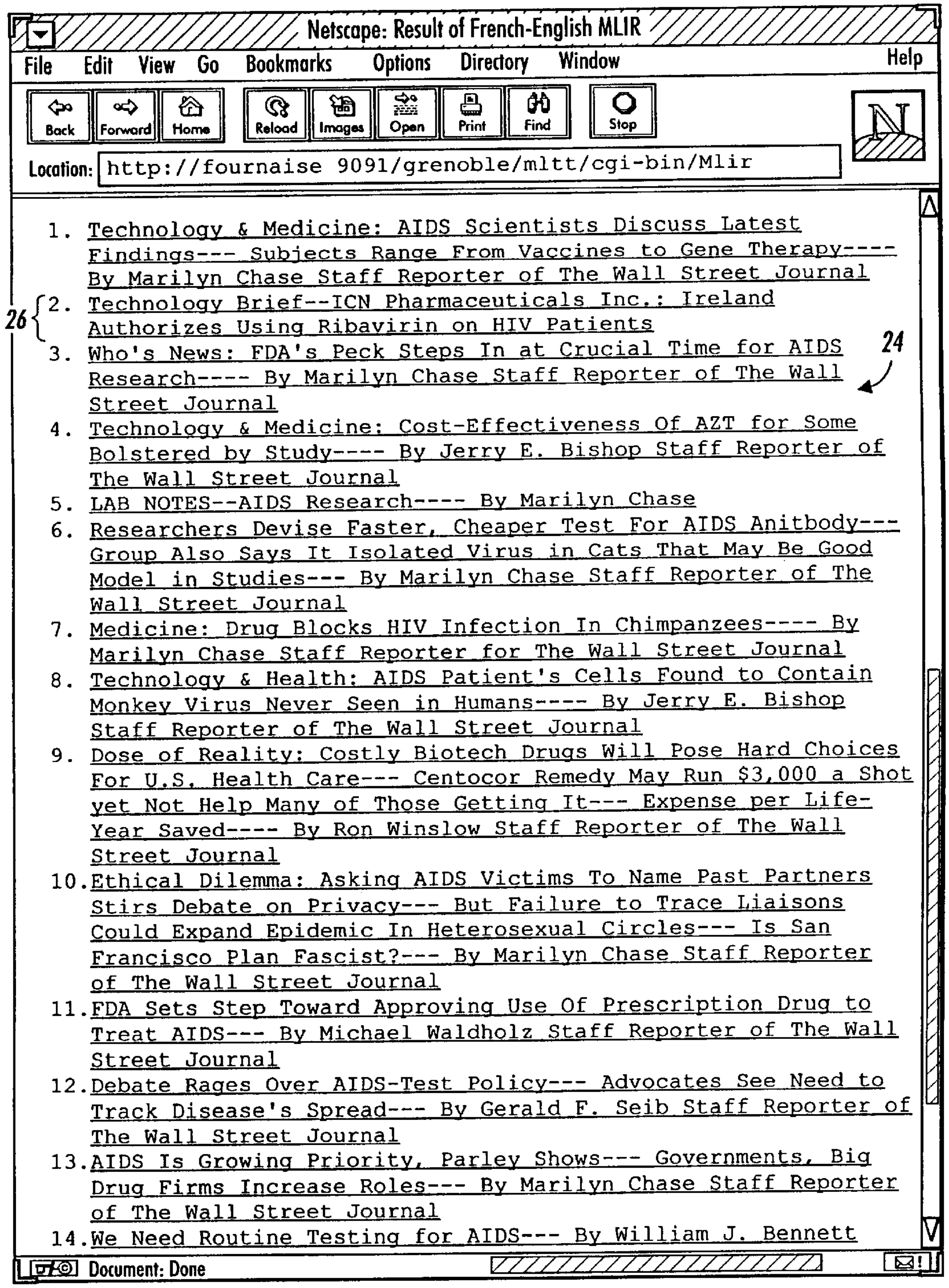
FIG. 11 illustrates a list returned by the information retrieval engine of titles of documents matching the query of FIG. 10, in ranked order.

FIG. 11 illustrates a list 24 returned by the information retrieval engine, including titles of documents matching the query of FIG. 10, in ranked order. As will be appreciated by persons skilled in the art, the invention can be suitably implemented by means of intemet-based search techniques, and the list 24 of relevant documents (or hits) can be suitably displayed in HTML format by means of a conventional web browser. The titles (14 of which are shown) suitably provide links to the documents themselves and, as is conventional, the document itself may be retrieved and viewed by the user selecting (e.g. using a mouse cursor; but equally by keyboard entry, pull-down menu or selection via touchscreen) one of the titles or links in the list 24. Here, the user is interested in the second listed document "Technology Brief . . . ", and has selected it for display by clicking with a mouse cursor on link 26, or by using any of the aforementioned selection methods.

Figure 12:
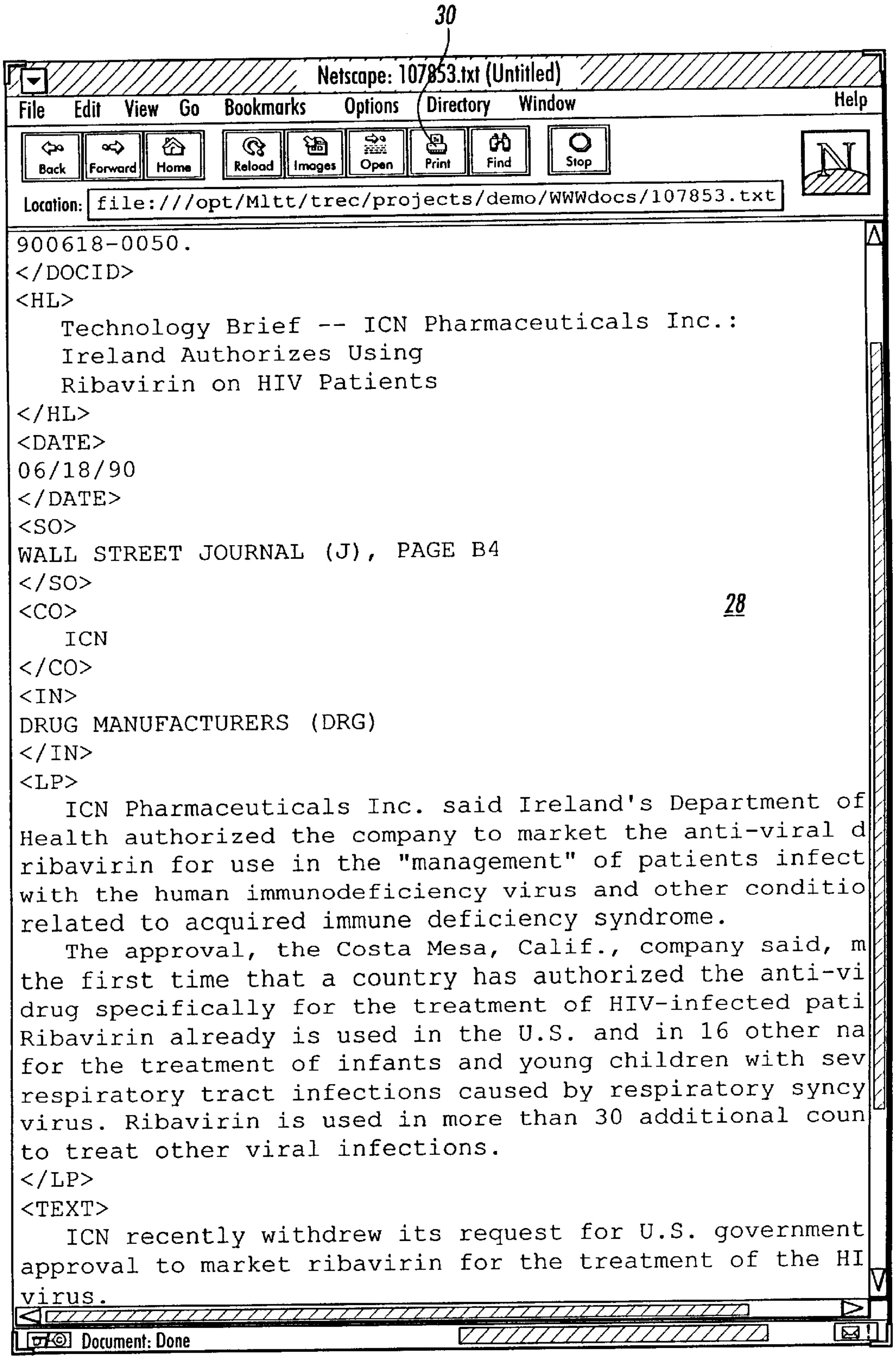
FIG. 12 shows the display of (the first page of) a document in the list of FIG. 11 following the selection of the document by a user.

FIG. 12 shows the display of (the first page of) a document 28 in the list 24 of FIG. 11 following the selection of the document by a user. The document can thus be viewed. As is conventional, the user may print out the document 28 via a mouse click on print button 30.

However, it well be appreciated that MFD 222 or another device at which the list 24 is obtained may be suitably programmed to automatically print out the list 24 itself, all of the documents on the list or a predetermined number N of the documents on the list 24, as in box 628 in FIG. 3C.

What is claimed is:

1. A method of using documents with text to obtain data for use in information retrieval, the method comprising:

(A) scanning a document that includes text in a first language to obtain text image data defining an image of a segment of the text;

(B) performing automatic recognition on at least part of the text image data to obtain text code data, the text code data including a series of element codes, each indicating an element that occurs in the first language, the series of element codes defining a first set of expressions, each of which occurs in the first language;

(C) performing automatic translation on a version of the text code data to obtain translation data, the translation data indicating a second set of expressions, each of the second set of expressions being a counterpart in the second language of one or more of the first set of expressions, wherein performing automatic translation further comprises:

(C1) using the version of the text code data to access a translation dictionary with each of the first set of expressions, the translation dictionary providing the translation data, such that the series of element codes define a first set of words that occur in the first language, and wherein (C1) further comprises:

(C1a) tokenizing the text code data to obtain token data indicating tokens that occur in the sequence of element codes, the tokens including the first set of words;

(C1b) disambiguating the token data to obtain disambiguated data, the disambiguated data including, for each of the first set of words, a part-of-speech indicator indicating the word's part of speech;

(C1c) lemmatizing the disambiguated data to obtain lemmatized data, the lemmatized data indicating, for each of the first set of words, either the word or a lemma for the word; and (C1d) translating the words and lemmas indicated by the lemmatized data to obtain the translation data, the translation data indicating possible counterparts in the second language for a subset of the words and lemmas indicated by the lemmatized data; and (D) using the second set of expressions to automatically obtain query data defining a query for use in retrieving a list of documents.

2. The method of claim 1 in which the document includes manual markings indicating the segment of the text and in which (A) comprises:

scanning the document to obtain document image data defining an image of the document including the text; and using the document image data to obtain the text image data by extracting the segment indicated by the manual markings.

3. The method of claim 1 in which (B) comprises:

performing optical character recognition on at least part of the text image data; the element codes including character codes indicating characters that occur in the first language.

4. The method of claim 3 in which (B) further comprises:

performing automatic language identification to obtain a language identifier indicating a candidate language that is likely to be the predominant language of the segment of the text; the optical character recognition being specific to the candidate language.

5. The method of claim 3, further comprising, after (B):

presenting the elements indicated by the series of element codes to a user;

receiving signals from the user indicating modifications of the presented elements; and modifying the series of element codes in accordance with the signals from the user to obtain the version of the text code data on which automatic translation is performed.

6. the method of claim 1 in which (C1d) comprises looking up the words and lemmas indicated by the lemmatized data in a bilingual translation dictionary to obtain counterparts in the second language.

7. The method of claim 1 in which the query data define the query in a format suitable for an information retrieval engine;

the method further comprising:

(E) providing the query data to the information retrieval engine.

8. A system for using documents with text to obtain data for use in information retrieval, the system comprising:

a scanning device for scanning documents and providing image data;

a processor connected for receiving image data from the scanning device, after receiving text image data defining an image of a segment of text in a first language from a document scanned by the scanning device, the processor operating to:

(A) perform automatic recognition on at least part of the text image data to obtain text code data, the text code data including a series of element codes, each indicating an element that occurs in the first language, the series of element codes defining a first set of expressions, each of which occurs in the first language;

(B) perform automatic translation on a version of the text code data to obtain translation data, the translation data indicating a second set of expressions, each of the second set of expressions being a counterpart in the second language of one or more of the first set of expressions, (B1) wherein during the automatic translation, the processor uses the version of the text code data to access a translation dictionary with each of the first set of expressions, the translation dictionary providing the translation data, such that the sequence of element codes define a first set of words that occur in the first language, and wherein the processor in (B1) further operates to:

(B1a) tokenize the text code data to obtain token data indicating tokens that occur in the sequence of element codes, the tokens including the first set of words;

(B1b) disambiguate the token data to obtain disambiguated data, the disambiguated data including, for each of the first set of words, a part-of-speech indicator indicating the word's part of speech;

(B1c) lemmatize the disambiguated data to obtain lemmatized data, the lemmatized data indicating, for each of the first set of words, either the word or a lemma for the word; and (B1d) translate the words and lemmas indicated by the lemmatized data to obtain the translation data, the translation data indicating possible counterparts in the second language for a subset of the words and lemmas indicated by the lemmatized data; and (C) use the second set of expressions to automatically obtain query data defining a query for use in retrieving a list of documents.

9. The system of claim 8, wherein the document includes manual markings indicating the segment of the text and in which the processor further operates to use the document image data provided by the scanning device to obtain text image data by extracting the segment indicated by the manual markings.

10. The system of claim 8 in which the processor operates in (A) to further perform optical character recognition on at least part of the text image data; the element codes including character codes indicating characters that occur in the first language.

11. The system of claim 10 in which the processor operates in (A) to further perform automatic language identification to obtain a language identifier indicating a candidate language that is likely to be the predominant language of the segment of the text; the optical character recognition being specific to the candidate language.

12. The system of claim 10, further comprising, after processing (A), the processor operates to;

present the elements indicated by the series of element codes to a user;

receive signals from the user indicating modifications of the presented elements; and modify the series of element codes in accordance with the signals from the user to obtain the version of the text code data on which automatic translation is performed.

13. The system of claim 8 in which the processor in (B1d) operates to look up the words and lemmas indicated by the lemmatized data in a bilingual translation dictionary to obtain counterparts in the second language.

14. The system of claim 8, wherein the query data define the query in a format suitable for an information retrieval engine.

* * * * *